E. T. BURROWES.
SPARE WHEEL FOR VEHICLES.
APPLICATION FILED APR. 17, 1908.
951,938.
Patented Mar. 15, 1910.
3 SHEETS—SHEET 1.
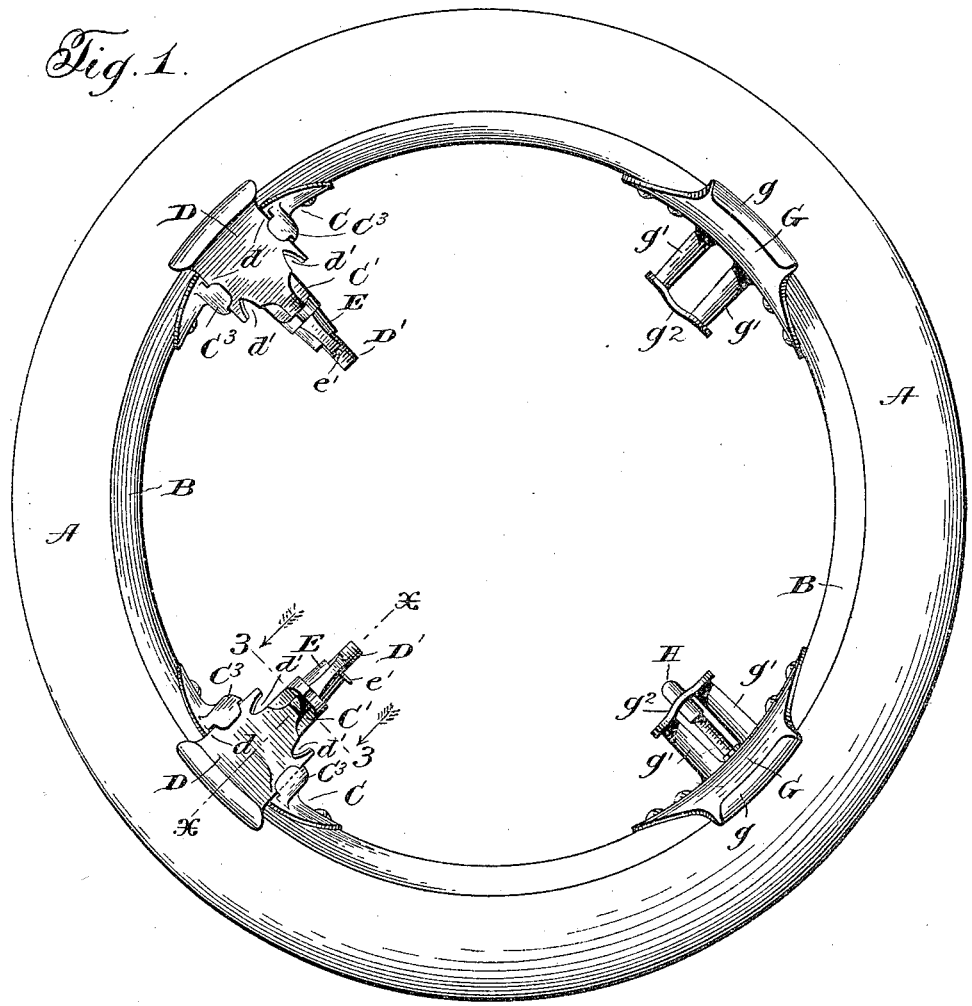
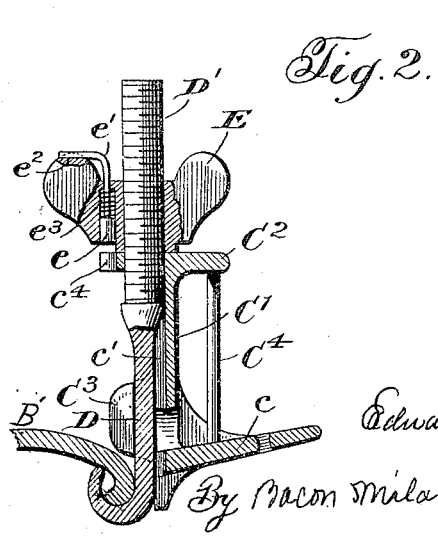

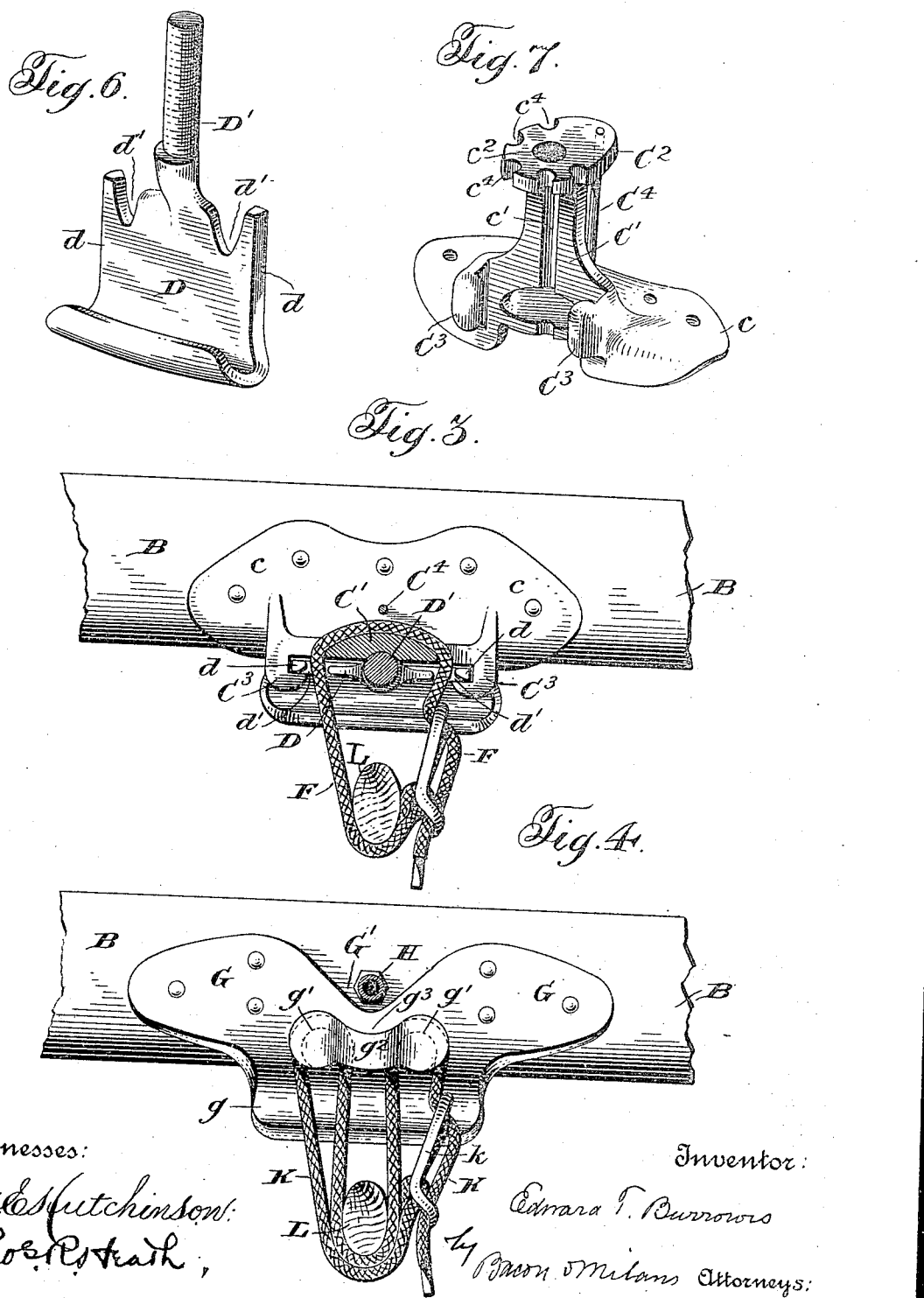

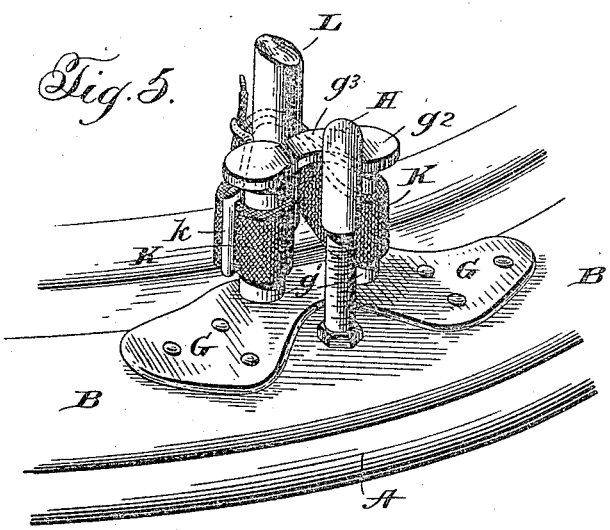
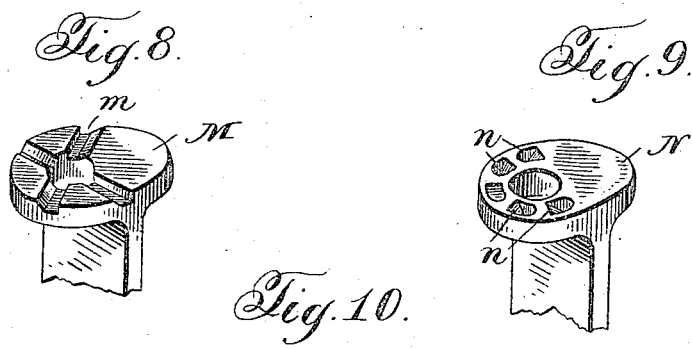
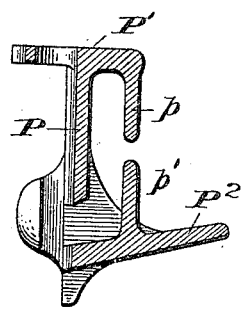

UNITED STATES PATENT OFFICE.

EDWARD T. BURROWES, OF PORTLAND, MAINE.

SPARE WHEEL FOR VEHICLES.

951,938.

Specification of Letters Patent. Patented Mar. 15, 1910.

Application filed April 17, 1908. Serial No. 427,699.

*To all whom it may concern:*

Be it known that I, EDWARD T. BURROWES, citizen of the United States, residing at Portland, in the county of Cumberland and State of Maine, have invented certain new and useful Improvements in Spare Wheels for Vehicles, of which the following is a specification, reference being had therein to the accompanying drawing.

This invention relates to an improvement in spare wheels for vehicles and is designed more particularly for use in connection with wheels of motor cars or automobiles.

The invention pertains more particularly to improvements in the means or mechanism for connecting the spare wheel to the rim of a pneumatic tire wheel and to means for securing the spare wheel in place against creeping.

The invention also relates to improvements in various features hereinafter to be specifically referred to and definitely pointed out in the claims.

In spare wheels for motor vehicles wherein certain hook shaped clamps are employed for taking over the edge of a rim of the wheel proper, it has been found that, owing to vibrations, the connections between the spare wheel and the main wheel soon become loosened.

One of the objects of the present invention is to provide a means for locking the parts in their adjusted positions and to permit minute adjustments of the parts and to lock them in such minute or specially adjusted positions. It has been found also in this class of inventions that it is advantageous to secure the spare wheel to the main wheel against creeping, and with that in view the present invention comprehends means for connecting the spare wheel independent of the clamping hook to the spokes of the wheel at different points to prevent this creeping of the wheel.

A further object of the invention is the provision of means for strapping the spare wheel to the spokes of the main wheel, which means comprises in a unitary structure a hook or clamp together with a part around which the straps may be applied.

A still further object of the invention is to provide an adjustable clamp so fashioned as to permit the same being used as a part around which a securing device may be placed to prevent the relative movement between the spare wheel and the vehicle wheel.

Other objects of the invention will be stated hereinafter.

In the drawings, a preferred embodiment of the construction is shown, but it is to be understood that changes and alterations can be made and the parts differently shaped without departing from the nature and spirit of the invention.

Figure 1 is an elevation of a spare wheel comprising a rim part with the improved clamping and securing means shown attached thereto, Fig. 2 is a section through line X—X, Fig. 1, Fig. 3 is a section through line 3—3, Fig. 1, showing the parts attached, and the strap encircling a spoke of the main wheel, Fig. 4 is a plan of the combined strap supports and hook plate, Fig. 5 is a perspective view of a section of the rim of the spare wheel and main wheel showing the combined strap support and hook plate and the nipple associated therewith, Fig. 6 is a perspective view of one of the movable clamping hooks, Fig. 7 is a similar view of the clamp support and guide, Figs. 8 and 9 are detail perspective views in modified forms of locking flanges, and Fig. 10 is a sectional view of a modified form of one of the movable clamp supports.

In the drawings, A designates the pneumatic tire and B the carrying rim thereof. Riveted or secured in any convenient manner on the inner face of the rim B, are two clamp supporting brackets C. These brackets are of like construction, and the description of one will alone be necessary. The bracket C consists conveniently of a base plate $c$ shaped to fit the inner surface of the felly or rim B, to which it is secured in any convenient manner. Springing outwardly from the plate $c$, is a standard C' carrying on its upper end a head plate $C^2$ which extends laterally beyond the plane of the sides of the standard, as shown in Fig. 7. This standard is provided with the vertical groove $c'$ in its outer face, the same terminating at its upper end in an opening or aperture $c^2$ in the head or flange $C^2$. $C^3$ designates guide arms extending outwardly transversely of the standard with their opposite outer ends being turned inward to form side guides for the removable clamp, presently to be referred to. Depending from the rear part of the head $C^2$ is a retaining wire $C^4$, the same conveniently extending from the head to which it is secured to the base plate, to which it is also secured. This wire or post, as shown in Fig. 3, is set back a short distance from the vertical part or standard $C'$, which latter has its rear face curved on a general arc from edge to edge, as shown in the said Fig. 3, for the purposes presently to be stated.

D designates the adjustable clamp or hook member having the guide flanges or sides $d$ formed at their upper edges with U-shaped depressions $d'$. Centrally located opposite the hook of the clamp D is a threaded stem $D'$, the diameter of which is greater than that of the main body of the plate or clamp D. This stem is designed to in part fit in the groove $c'$ of the standard of the bracket C and to project through the opening in the head $C^2$ of the standard and beyond the same so that when the parts are assembled, as shown in Figs. 1 and 2, the edges $d$ of the clamp will fit between the guides $C^3$ of the bracket while the stem will be positioned in the groove and opening of the standard.

To secure the adjustable clamp in its various positions of adjustment, a nut conveniently of the butterfly type E, is placed on the protruding end of the stem of the adjustable clamp beyond the head of the standard. Inasmuch as this device is designed for the particular application specified, it is desirable to provide a suitable means for securing the nut E against loosening after the clamp has been properly adjusted and set. With this in view, I provide the head $C^2$ of the standard with a series of marginal apertures, such as $c^4$, and provide the nut E with a spring actuated plunger or pin $e$ fitted in a cavity or bore extending vertically from the lower side of the nut up into the body of the nut. This plunger $e$ has a small stem $e'$ extending out beyond the upper edge of the nut, its outer end conveniently being turned at right angles and designed to fit a small groove $e^2$ in the edge of one of the wings of the nut E. To normally force the pin $e$ out, a small spiral spring $e^3$ is placed in back of the same around the stem $e'$ and within the cavity in which the pin $e$ works. In adjusting the nut, it is desirable to prevent the locking pin $e$ from engaging with the notches in the head $C^2$ and therefore the angular extension on the stem $e'$ of the locking bolt or pin is provided, it being only necessary to shift the end of this stem into the groove on the wing of the nut, in which position it is held against the pressure of the outwardly thrusting spring. When the clamp has been drawn sufficiently tight onto the rim $B'$ of the main wheel, the locking pin $e$ is released and immediately engages in its coinciding or alining opening or notch in the head $C^2$, thereby securing the nut against accidental displacement and the clamp from becoming loose.

To prevent the spare wheel from moving independently of the main wheel by creeping, also against outward deflection or movement, I associate with the standard $C'$ a securing strap F. This I am enabled to do by forming the standard with sides of a width greater than the width of the stem and said sides being immediately adjacent the portions $d'$ of the adjustable clamp D, as shown more particularly in Fig. 3. This strap is placed around the standard resting against the rear curved face thereof, and when in use is looped over around the spoke L of the main wheel. The strap is conveniently provided with a clamping buckle or other means, whereby it may be drawn close about the two members, around which it is extended and locked or clamped in its taut condition. It will be noticed that by providing the standard with extended sides and by providing the depressions $d'$ in the upper edge of the hook shaped clamping jaw, the jaw is permitted a free movement without being interfered with by the presence of the strap F, as will be seen by a reference to the position of the parts in Fig. 3. This arrangement permits the full actuation of the hook clamp D in or out when it is being applied to the rim of the main wheel. To prevent the strap from escaping from the standard when the rim of the spare wheel is not in use, I employ the post or wire $C^4$ above referred to, between which and the standard the strap is passed. Other arrangements can be made for securing this result, as for instance, the construction shown in Fig. 10, may be employed wherein a casting is shown having the standard P, on which is a depending lug $p$ on the head $P'$, and an upwardly extending lug $p'$ extending from the base $P^2$, a space being left between the two lugs sufficient only to permit the insertion of the strap edgewise. Other arrangements for retaining the strap in position can be made.

Conveniently, two of the adjustable hooking clamps are employed arranged at one side of the center of the rim or spare wheel, although any number may be employed, and the wheel may be equipped with stationary hooks or fixed clamps, as shown in Fig. 1. The fixed clamps are conveniently of any number and consist each of a base plate G which is secured to the rim B and which has the hook portion $g$ for taking over the rim of the main wheel. Conveniently integral with the plate G are the two pillars $g'$ secured at their upper end by an arched plate $g^2$ so that the pillars are braced against separation. The rear of the arched plate $g^2$ is cut out or curved, as at $g^3$ Figs. 4 and 5, while the base plate G is also cut out centrally, as at G', and within this portion closely adjacent the pillars is the nipple H for the pneumatic tire carried by the rim B. By placing the nipple in close proximity to the pillars, it is protected against breakage when the spare wheel is being applied, or while it is stored on the machine ready for use.

The hook part of the plate G corresponds with the hook part of the movable clamp D and when the parts are to be applied to the rim of the main wheel, it is only necessary to place the two stationary or fixed hooks over the rim, and then to adjust the movable hooks D to the opposite parts of the rim of the main wheel, drawing the adjustable hooks inward until they are tightly set against the rim, in which position they are locked by the locking pin, as above described.

By providing the stationary hook clamps with the pillars, I am enabled to employ in connection therewith, suitable straps for connecting the same with the spokes of the main wheel. This is accomplished by the employment of a strap having a buckle or clamp at one end with which the free or opposite end is designed to engage, in a well known manner. The strap is illustrated at K, Fig. 4, and is first threaded around one of the pillars between the two pillars, thence around the spoke L of the main wheel, back around the opposite pillar, and thence through the clamping buckle $k$. By this means, the parts of the spare wheel, which is secured to the main wheel by the fixed clamps, are held directly from movement either circumferentially or laterally, by the drawing up of the straps K, and the tire on the main wheel which has become collapsed, is prevented from becoming abraded or worn by an independent movement of the stationary clamps relative thereto. I have found that canvas straps serve well the purpose, and that by using the clamp form of buckle, as distinguished from the tongue form requiring perforations in the strap, a very secure and stable construction is provided.

Various modified forms of automatic locking devices for the securing nut of the adjustable clamping hooks can be provided, and I have shown in Fig. 8 a form of radiating slots $m$ having one of the walls inclined and the opposite wall vertical or at right angles similar to an ordinary ratchet tooth, there being four or any number of these slots employed in the head M. In Fig. 9, I have shown a construction of head N having a series of pockets $n$ therein formed with inclined walls, so that the locking pin may move automatically into and out from the said pockets during adjustment.

I do not wish to be limited to the various details as above indicated, as I believe I am the first to provide a clamping hook of any type constructed so as to permit the use, in connection therewith, of a securing strap or other securing means for connecting it with the spoke of the main wheel or for preventing creeping. I believe that I am also the first to provide an adjustable clamping hook with means acting automatically for preventing the accidental loosening of the hook, after the same has been secured to the rim.

In Fig. 2, I have shown the manner of projecting the clamping hooks over the edge of the rim of the main wheel.

By the term "spare wheel," I desire it understood that I refer to a member or supplemental wheel part which will serve, when coupled to the main wheel, as a support for that portion of the load usually carried by the main wheel, when the tire of the main wheel has become ruptured or deflated. The so-called "spare wheel" carries an inflated tire and is ready for use upon the contingency of puncture or deflation of the main wheel tire.

Having thus described the invention, what is claimed as new and desired to be secured by Letters Patent is:

1. In a spare wheel, the combination with a movable clamping member adapted to engage a part carried by the main wheel of a vehicle, and means associated therewith for securing the same to the main wheel independent of the clamp.

2. In a spare wheel for vehicles, the combination with a movable clamping member, of means for adjusting the said clamping member, and a strap associated with said clamping member and embracing the same for securing the said clamping member to the main wheel.

3. In a spare wheel for vehicles, the combination with a movable hook clamp, of a bracket supporting the same, and means associated with said bracket independent of the hook clamp for preventing the independent movement between the spare wheel and the main wheel.

4. In a spare wheel for vehicles, the combination with a bracket member, of a clamp member and a flexible attaching member connected with the clamp member for securing the same to the main wheel independent of the clamp.

5. As an attaching device for spare wheels for vehicles, a hook shaped clamping member for engaging the rim of the main wheel, and means connected with said device for securing the same to the main wheel independent of the hook.

6. As an attaching device for spare wheels for vehicles, a hook shaped clamping member for engaging the rim of the main wheel, and means connected with said device for securing the same to the spoke of the main wheel independent of the hook.

7. In a clamping attachment for spare wheels, a hook shaped member for engaging the rim of the main wheel, a standard associated with said hook shaped member, and a flexible member embracing the standard and adapted to embrace a part of the main wheel.

8. A clamping device for spare wheels comprising an outwardly projecting part for engaging one part of the main wheel, and an auxiliary adjustable attaching device for engaging a different part of the main wheel independent of said other engaging part.

9. In a spare wheel for vehicles, a hook shaped clamping member, pillars projecting therefrom, and a strap embracing the pillars and a spoke of the main wheel.

10. In a spare wheel for vehicles, the combination of a rim member, a tire for the rim, a nipple member for the tire passing through the rim, a clamping hook member mounted on the rim, the clamp hook member comprising a base having an indented portion for the reception of said nipple member, and strap attaching pillars on said base on opposite sides of the nipple whereby the latter is protected.

11. A spare wheel for vehicles, a plurality of clamp hook members, one of which has an indented base, a nipple member arranged adjacent to said base and within the indented portion thereof, and strap attaching pillars on the base adjacent said nipple.

12. A spare wheel for vehicles, a plurality of hook members one of which has a base, a nipple member arranged adjacent to said base, and strap attaching pillars connected to one another at their upper ends and supported on the base adjacent said nipple.

13. As a means for clamping spare wheels to main wheels, the combination with a bracket member having a head with a series of recesses therein, an adjustable clamping member having a threaded stem passing through the head, a nut on the threaded member, a spring actuated locking device carried by the nut adapted to engage and be disengaged from said recesses, and means for locking the device out of engagement with the recesses.

14. In a clamping device for spare wheels, the combination of an adjustable clamp and a bracket for carrying the same having recesses therein, a nut, a spring actuated locking pin passing through the nut and adapted to engage said recesses, and means for holding said pin against the action of the spring out of engagement with the recesses comprising an offset member at the upper end of the stem and an engaging seat on the nut.

15. In a spare wheel a clamping device therefor comprising the combination with a bracket having a standard part formed with substantially straight side walls and a curved rear wall, an adjustable clamp fitted in the bracket, and means associated with the standard for retaining a strap or attaching means thereon.

16. In a clamping device for spare wheels, the combination with the bracket member having a standard, and head, of a member depending from the head, a strap interposed between said member and standard, and an adjustable clamping device carried by the bracket.

17. In a clamp for spare wheels, the combination with a bracket having a standard formed with substantially straight sides, of a clamp movable in the bracket and having a stem carrying a nut for adjusting the same, the parts of the clamp adjacent the stem being cut away to form depressions on opposite sides of the stem, and a strap carried by the bracket.

In testimony whereof I affix my signature in presence of two witnesses.

EDWARD T. BURROWES.

Witnesses:
FRANK L. RICKER,
L. GROVES WEYMOUTH.